(12) United States Patent
Arora

(10) Patent No.: US 6,393,556 B1
(45) Date of Patent: *May 21, 2002

(54) APPARATUS AND METHOD TO CHANGE PROCESSOR PRIVILEGE WITHOUT PIPELINE FLUSH

(75) Inventor: Judge K. Arora, Cupertino, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,421

(22) Filed: Oct. 30, 1998

(51) Int. Cl.[7] .................................................. G06F 9/00

(52) U.S. Cl. ........................ 712/229; 712/43; 712/228

(58) Field of Search ........................... 712/43, 228, 229

(56) References Cited

U.S. PATENT DOCUMENTS

| | | | | |
|---|---|---|---|---|
| 5,144,551 A | * | 9/1992 | Cepulis | 395/425 |
| 5,487,156 A | * | 1/1996 | Popescu et al. | 395/375 |
| 5,692,170 A | * | 11/1997 | Isaman | 395/591 |

* cited by examiner

Primary Examiner—John A. Follansbee
(74) Attorney, Agent, or Firm—Blakely, Sokoloff, Taylor & Zafman LLP

(57) ABSTRACT

An apparatus and method for changing privilege level in a processor configured to pipeline instructions are presented. The processor includes a first memory storing an architectural privilege level that is set at a first privilege level, a second memory storing a plurality of instructions, and a pipeline including a plurality of processing stages. A first instruction is fetched from the memory and a determination is made whether the first instruction requires the first privilege level be changed to a second privilege level, and in response thereto, any subsequent instructions are flushed from the pipeline before recording the second privilege level in the first memory.

18 Claims, 5 Drawing Sheets

APPARATUS AND METHOD TO CHANGE PROCESSOR PRIVILEGE WITHOUT PIPELINE FLUSH

BACKGROUND OF THE INVENTION

1. Field of the Invention

The invention relates generally to computer processors, and more particularly, to changing the privilege level of a computer processor.

2. Description of Related Art

Computers and many other types of machines are engineered around a "processor." A processor is an integrated circuit that executes programmed instructions stored in the machine's memory. Some processors "pipeline" instructions. The processor reads instructions from memory and feeds them into one end of the pipeline. The pipeline is made of several "stages," each stage performing some function necessary or desirable to process instructions before passing the instruction to the next stage. For instance, the first stage might fetch the instruction, the next stage might decode the fetched instruction, and the next stage might execute the decoded instruction. Each stage of the pipeline typically moves the instruction closer to completion. A pipeline therefore has the tremendous advantage that, while one part of the pipeline is working on a first instruction, a second part of the pipeline can be working on a second instruction. Thus, more than one instruction can be processed at a time, thereby increasing the rate at which instructions can be executed in a given time period. This, in turn, increases the processor throughput.

In order to effect security features and provide multi-user capability in processors, including pipelined processors, operating system software needs to prevent the user from performing certain dangerous (insecure) operations. For example, operating system instructions may be assigned one privilege level, while application program instructions may be assigned a lower privilege level. Thus, the operating system instruction would have access to some system resources that the application program instructions would not have access to. Privilege levels can sometimes be dynamic in the sense that they can occasionally change.

To accomplish this, the operating system software assigns a privilege level to the processor. A "current privilege level" ("CPL") for the processor is normally maintained in the processor's architectural register set. Changing the processor's privilege level, however, is often a costly function when measured by the number of processor clock cycles needed to perform the operation. Known processors empty, or "flush" the pipeline on every operation that changes the privilege level, when the instruction changing the privilege level executes and the CPL is updated. This insures that the proper privilege level is applied to instructions in the pipeline, but results in reduced processor performance.

FIG. 1 conceptually illustrates a pipeline 10 of a prior art processor having, for purposes of illustration, four stages: fetch 11, decode 12, execute 13, and retire 14. Pipelines of prior art processors, such as the pipeline 10 illustrated in FIG. 1, operate at a single privilege level at any given time. Hence, at time T1, the pipeline 10 is operating at a first privilege level assigned by the operating system, and implemented via a previously executed instruction. A first instruction 21 is fetched from memory during the fetch stage 11 of the pipeline 10 at time T1. Assume that the first instruction 21 will direct the processor to change the CPL to a different privilege level.

At time T2, the first instruction 11 proceeds to the decode stage 12, and a second instruction 22 is fetched. The first and second instructions 21, 22 continue down the pipeline 10, and third and fourth instructions 23, 24 enter the pipeline during time T3 and T4. When the first instruction 21 is retired (time T4), the CPL of the pipeline 10 is updated to the new privilege level as directed by the first instruction 21. When the first instruction 21 is retired, or exits the pipeline, to insure that the subsequent instructions 22, 23, 24 are executed at the proper privilege level, the pipeline 10 is flushed, and the work done on the second, third, and fourth instructions 22, 23, 24 during time periods T2–T4 is lost. The second instruction 22 restarts the pipeline 10 at time T5, and is not retired until time T8.

Thus, when the privilege level of a prior art pipeline is changed, many of the advantages gained by pipelining instructions are lost. The present invention addresses these, and other shortcomings of the prior art.

SUMMARY OF THE INVENTION

In one aspect of the present invention, a processor maintains an architectural privilege level that is assigned a first privilege level. A method of pipelining instructions in such a processor includes processing a first instruction that directs the processor to change the architectural privilege level to a second privilege level, and flushing any subsequent instructions from the pipeline prior to changing the architectural privilege level to the second privilege level.

In another aspect of the invention, a processor configured to pipeline instructions includes a first memory in which a first privilege level is recorded, a second memory storing a plurality of instructions, and a pipeline including a plurality of processing stages. The processor is adapted to fetch a first instruction from the second memory and determine whether the first instruction requires the first privilege level be changed to a second privilege level, and in response thereto, flush any subsequent instructions from the pipeline before recording the second privilege level in the first memory.

BRIEF DESCRIPTION OF THE DRAWINGS

Other objects and advantages of the invention will become apparent upon reading the following detailed description and upon reference to the drawings in which.

Figure 1:
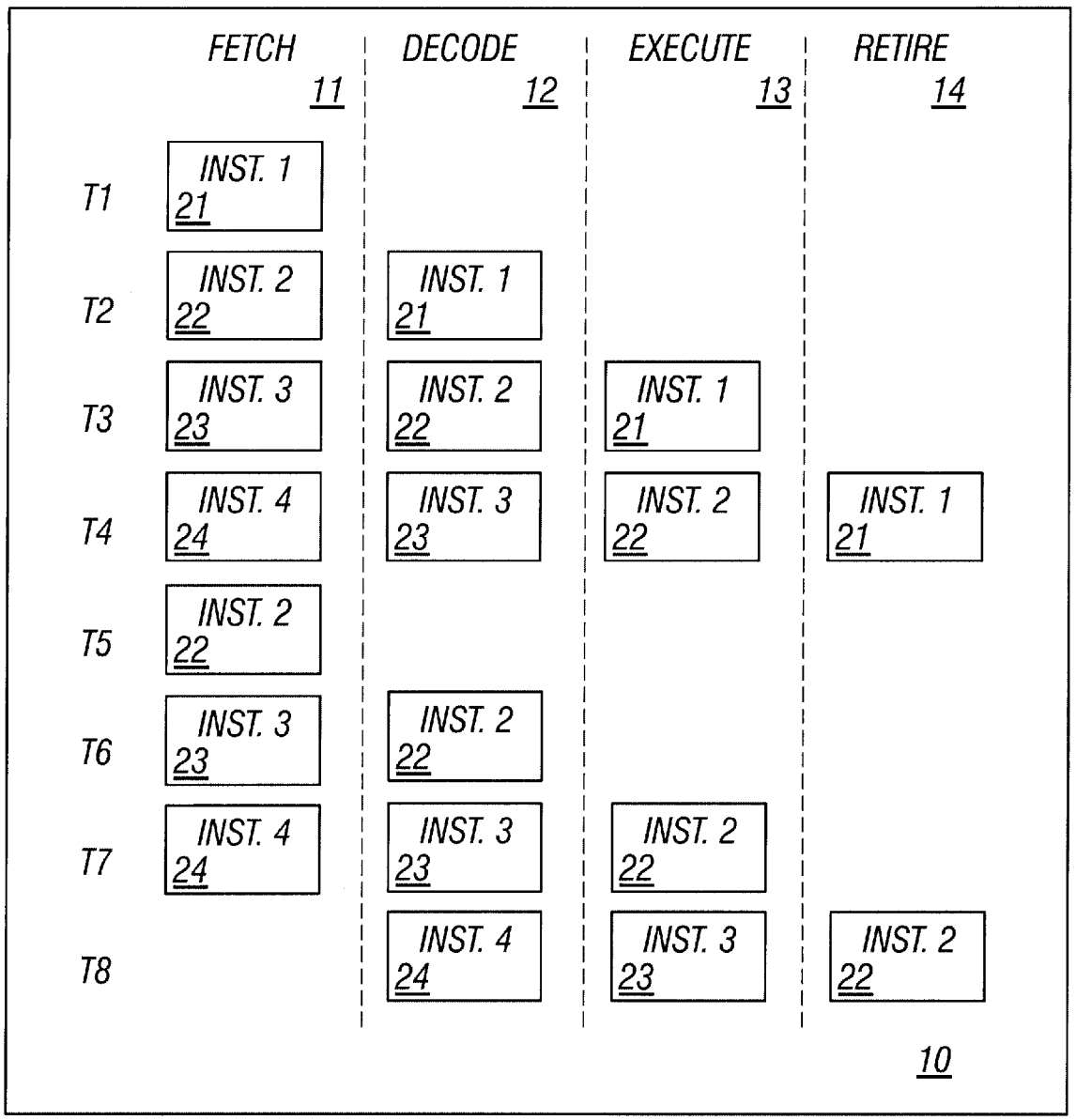
FIG. 1 conceptually illustrates a series of instructions flowing through a pipeline of a prior art processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that, even if such a development effort might be complex and time-consuming, it would nevertheless be a routine undertaking for those of ordinary skill in the art having the benefit of this disclosure.

Figure 2:
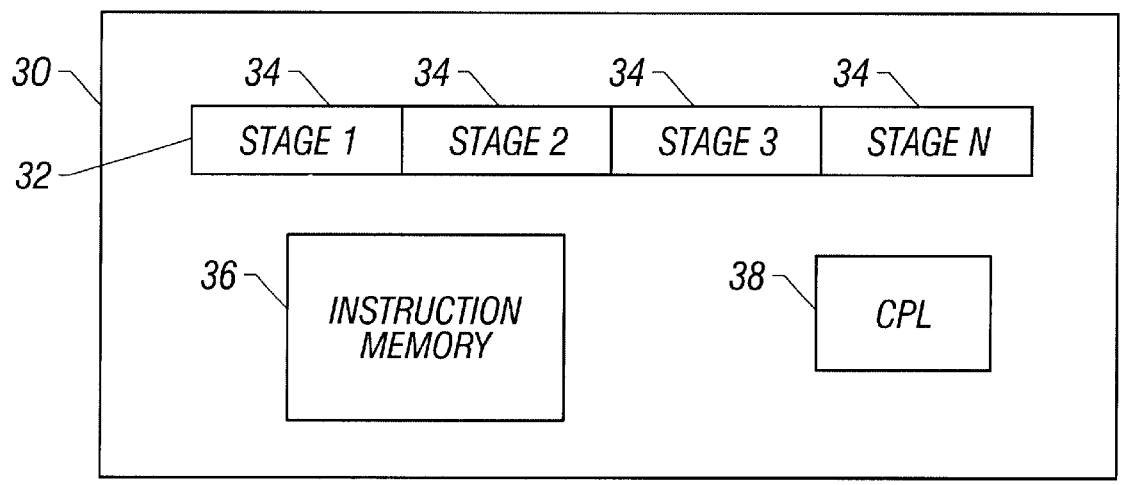
FIG. 2 conceptually illustrates portions of a processor in accordance with an embodiment of the present invention.

Turning to the drawings, FIG. 2 conceptually illustrates portions of a processor 30 in accordance with an embodiment of the present invention. The processor 30 includes a pipeline 32, which comprises a plurality of processing stages 34. A memory 36, such as a cache memory, stores a plurality of instructions that are processed in the pipeline 32. A cache memory is a portion of memory that operates faster than main memory. For example, a cache memory may be made of high-speed static random access memory (SRAM) instead of the slower and cheaper dynamic RAM (DRAM) often used for main memory (not shown in FIG. 2). The first time an instruction is executed, it must be loaded from the relatively slow main memory. Recently-accessed memory locations are saved in the cache in case they are needed again, so each instruction will be saved in the cache after being loaded from memory the first time. The next time the processor wants to use the same instruction, it will check the cache first, see that the instruction it needs is there, and load it from the cache instead of going to the slower system main memory. The number of instructions that can be buffered this way is a function of the size and design of the cache.

The present invention is not limited to a pipeline having any particular number or types of stages 34, nor is the present invention limited to any particular method of executing instructions in general. For example, a typical pipeline 32 includes a stage during which instructions are fetched from the memory 36, a stage wherein the fetched instructions are decoded, and a stage in which the instructions are actually executed. In some processors, results of the instruction execution immediately affect the processor's architectural state. In other words, the results of an instruction's execution are written directly to the processor's register set.

Some processors execute instructions speculatively, and as a result of this, the results of an instruction's execution sometimes are not actually used. For instance, changes in program flow may mean that the instruction should never have been encountered in the first place. In particular, this occurs with "branch" instructions, where a condition is tested and the program path is altered depending on the results. In processors such as these, results from executing instructions are written to a temporary register to ensure that the instructions have executed properly. Once the processor determines that the output of the instruction execution has been produced properly, the instruction is retired, or allowed to affect the processor's state; in other words, when the instruction is retired, the results of the execution are transferred from the temporary register to the processor's "real," or "architectural," register set.

Further, "out-of-order" processors are capable of executing some instructions in a sequence different than the original program order—instruction 2 may be executed before instruction 1. Out-of-order processors, which also may execute instructions speculatively, write results from executing instructions to a temporary register so that the instructions may be reordered into their original sequence. Once the instruction execution results are properly reordered, the instructions are retired—the results are transferred from the temporary register to the processor's architectural register set. All such execution techniques are within the scope and spirit of the invention as claimed below.

In order to effect security features and provide multi-user capability, the processor 30 also maintains a "current privilege level" ("CPL") 38 in a memory storage device, such as a register. Since the CPL is maintained in the processor's register set, it is referred to as the "architectural" CPL. The operating system sets the architectural CPL to prevent the user from performing dangerous or insecure operations. If the pipeline 30 is currently processing an application program instruction, a prior instruction would have set the architectural CPL 38 to the proper privilege level. If an instruction requiring a higher privilege level follows the current instruction, an instruction, such as an "enter privilege code" ("EPC") instruction, that directs the processor to change the privilege level of the architectural CPL must first be processed to increase the privilege level.

Figure 3:
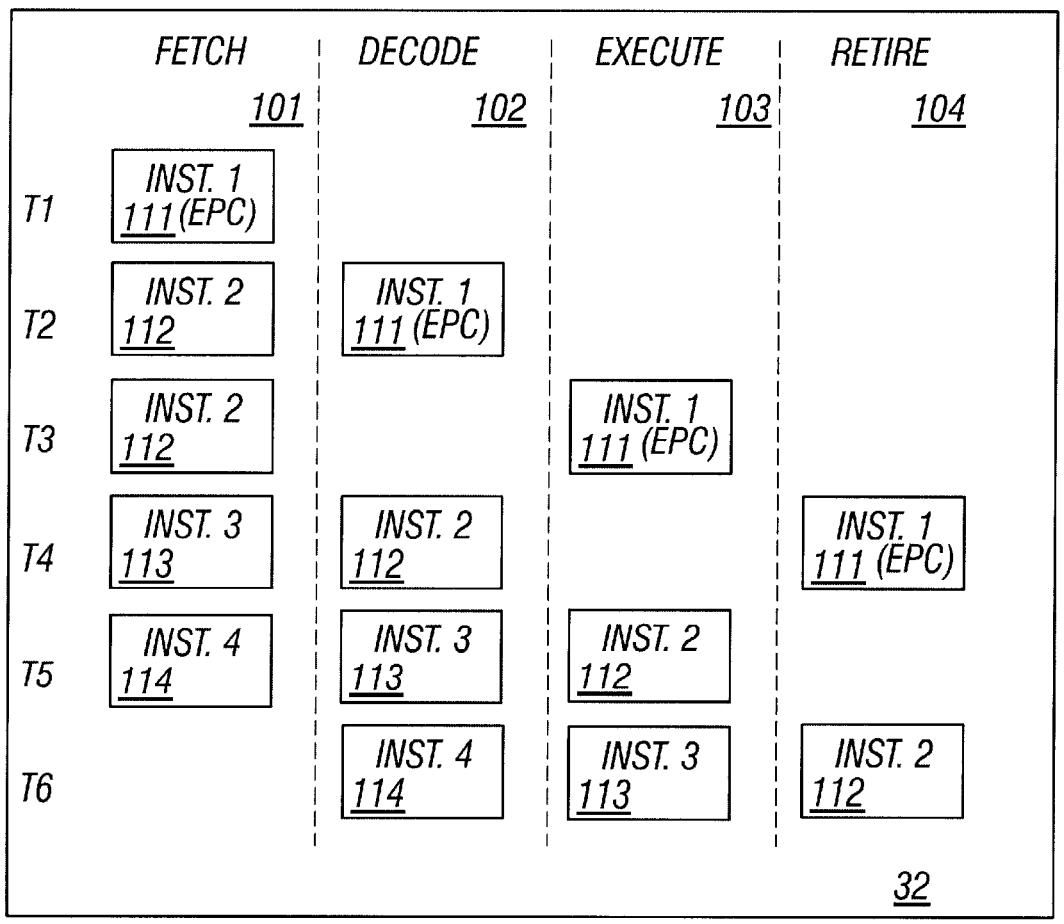
FIG. 3 conceptually illustrates a series of instructions flowing through a pipeline of a processor in accordance with an embodiment of the present invention.

FIG. 3 conceptually illustrates a series of instructions flowing through the pipeline 32 of FIG. 2, in accordance with an embodiment of the invention. The pipeline 32 includes a plurality of stages, including a fetch stage 101, a decode stage 102, an execute stage 103, and a retire stage 104. The specific stages 101–104 shown in the pipeline 32 of FIG. 3 are exemplary only; as discussed above, the present invention is not limited to processors having any specific number or types of pipeline stages.

Prior to time T1, the architectural CPL 38 is set at a first privilege level by a prior instruction. Assume a first instruction 111 is an EPC instruction, which will direct the processor 30 to change the architectural CPL 38 to a second privilege level. In some embodiments of the invention, instructions are provided to the pipeline 32 as a group of instructions, and instructions fetched in a single clock may be referred to as an "issue group." In these embodiments, the instructions in the issue group typically operate at the same privilege level, and an EPC instruction is included in the issue group to set the architectural CPL 38 to the proper privilege level.

At time T1, the EPC instruction 111 enters the pipeline 32. In other words, as illustrated in FIG. 2 and FIG. 3, the EPC instruction 111 is fetched from the instruction memory 36, which, as discussed above, would typically be a cache memory. At time T2, the EPC instruction 111 is decoded, and a second instruction 112 enters the pipeline 32 at the fetch stage 101. When the EPC instruction 111 is decoded, the pipeline 32 "realizes" that the first instruction 111 is an EPC instruction that eventually may cause the processor 30 to change the architectural CPL 38 to a second privilege level. In other embodiments, the determination that the instruction may cause a privilege level change may occur at a pipeline stage other than the decode stage 102; for instance, prior to decoding the instruction. Upon determining that the first instruction 111 is an EPC instruction, the processor 30 flushes the second instruction 112, and any other subsequent instructions, from the pipeline 32. Note that this flush occurs prior to the retirement of the first instruction 111. Thus, at time T3, the EPC instruction 111 has moved to the next pipeline stage, the execute stage 103 in FIG. 3, and the second instruction 112 is again fetched from the instruction memory 36 at the fetch stage 101.

The point at which the architectural CPL 38 is updated to the second privilege level may vary depending on the operation of the specific type of processor 30. For example, some processors may not include the retire stage 104 shown in FIG. 3, if results of instruction executions in the execute stage 103 immediately affect the processor's architectural state. In a processor such as this, the architectural CPL 38 would be updated is upon execution of the EPC instruction. Regardless of the method by which the processor's state is affected, the embodiment of the processor 30 in accordance with the present invention flushes the pipeline 32 upon determining that an instruction will require changing the architectural CPL 38 from a given privilege level to a different level, without waiting until the processor's architectural state is affected (changing the architectural CPL 38), as in prior art processors. Moreover, only those instructions subsequent to the instruction changing the privilege level are flushed, rather than all instructions in the pipeline 32. This improves processor performance by reducing the amount of wasted processing caused by pipeline flushes.

The performance improvement is further illustrated by comparing FIG. 3, illustrating instruction flow through the pipeline 32 in accordance with the present invention, to the prior art instruction flow illustrated in FIG. 1. In the prior art illustration of FIG. 1, the entire pipeline 10 is flushed when the EPC instruction is retired and the architectural CPL is changed. This results in wasting the processing that occurred on the second, third, and fourth instructions 22, 23, 24 during times T2, T3, and T4, which is repeated during times T5, T6, and T7. In the prior art pipeline 10 of FIG. 1, the second instruction 22 is not retired until time T8. In comparison, referring to FIG. 3, only the processing on the second instruction 112 during time T2 is lost when the processor 30 flushes a portion of the pipeline 32, before changing the architectural CPL. With the pipeline 32 illustrated in FIG. 3, the second instruction 112 is retired at time T6, two clocks earlier than the prior art device 10 illustrated in FIG. 1.

Figure 4:
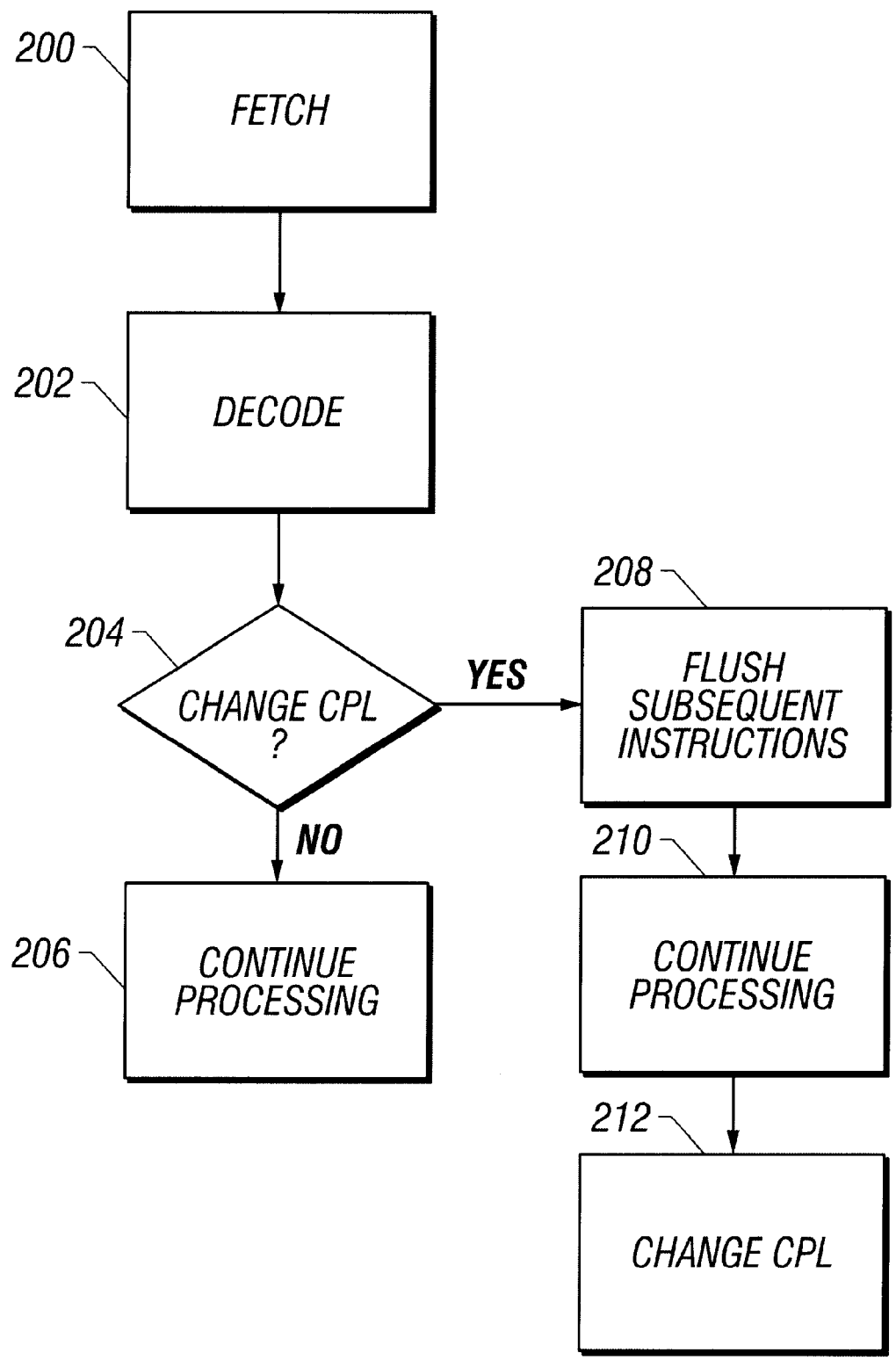
FIG. 4 is a flow diagram illustrating a method in accordance with an embodiment of the present invention.

FIG. 4 is a flow diagram, illustrating a method in accordance with an embodiment of the present invention. Referring to FIG. 4 in conjunction with FIG. 2, an instruction is fetched from the instruction memory 36 in block 200, and decoded in block 202. In decision block 204, the processor determines whether the fetched instruction directs the processor 30 to change the architectural CPL 38 from a first to a second privilege level, such as an EPC instruction. If the instruction does not direct the processor 30 to change the architectural CPL 38, the processor 30 continues processing the instruction, and subsequent instructions, in block 206. If the instruction directs the processor 30 to change the architectural CPL 38, the processor 30 flushes any subsequent instructions from the pipeline 32 in block 208 as described above in conjunction with FIG. 2 and FIG. 3. In block 210, the instruction continues down the pipeline 32, until the instruction is executed and the processor's state is affected in block 212, wherein the architectural CPL 38 is changed from the first to the second privilege level. In alternative embodiments, the determination of whether the fetched instruction directs the processor 30 to change the architectural CPL 38 (block 204) may follow a pre-decode stage, rather than waiting for the instruction to be completely decoded. It is desirable to determine whether a given instruction will cause a privilege level change as close to the pipeline's front end as possible, to minimize the amount of processing lost by pipeline flushes.

Figure 5:
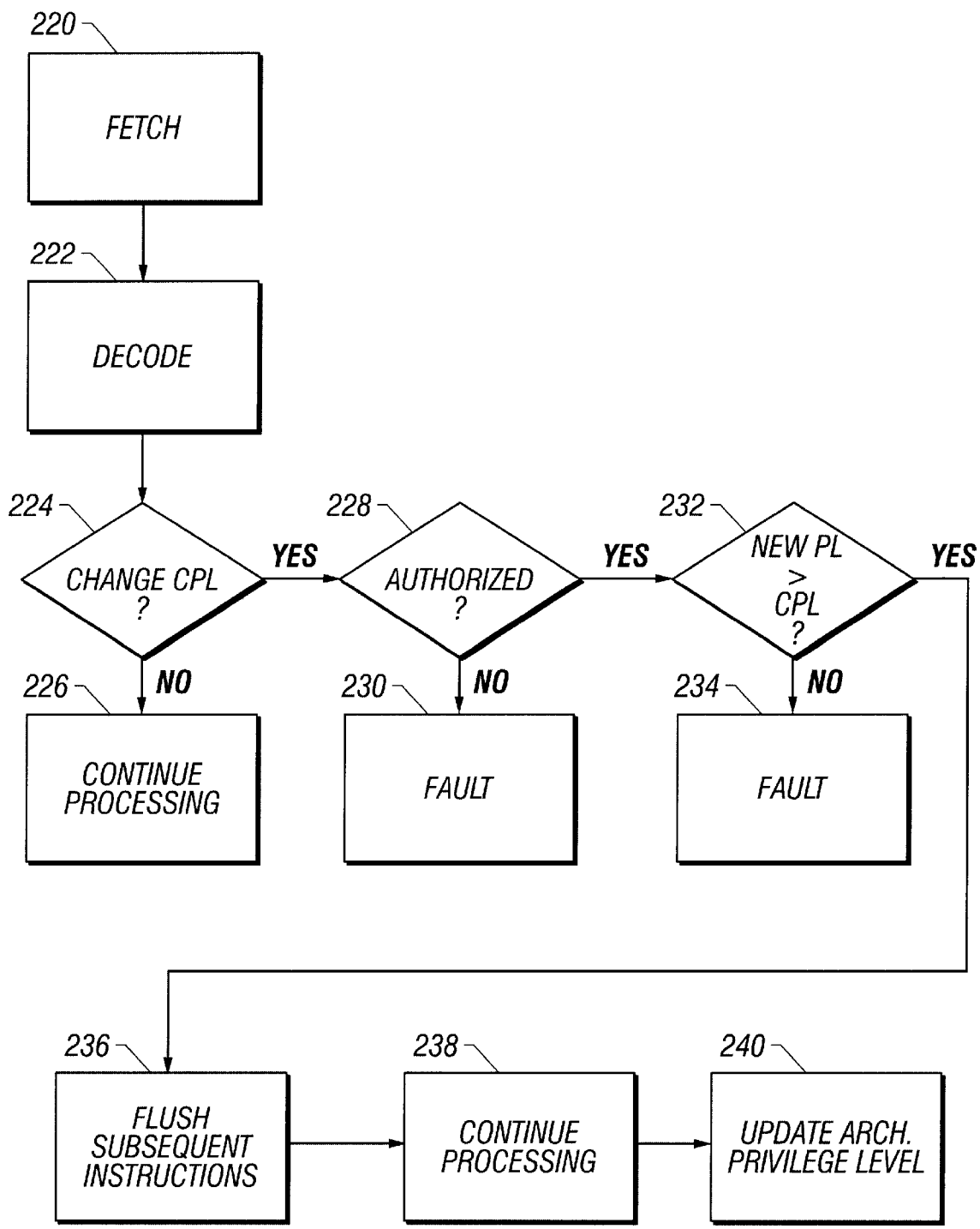
FIG. 5 is a flow diagram illustrating a method in accordance with another embodiment of the present invention.

FIG. 5 is a flow diagram illustrating a method in accordance with other embodiments of the invention. In blocks 220 and 222, an instruction is fetched and decoded, respectively. In decision block 224, the processor 30 determines whether the instruction will direct the processor 30 to change the architectural CPL 38 from a first privilege level to a second privilege level. If the instruction does not direct the processor 30 to change the architectural CPL 38, the processor 30 continues processing the instruction, and subsequent instructions, in block 226. If the instruction directs the processor 30 to change the CPL 38, the processor then determines, in decision block 228, whether the instruction is authorized to change the privilege level 38. Typically, only operating system instructions may change privilege level. If the processor 30 determines that the instruction, such as an application program instruction, is not authorized to change the CPL 38, a fault is generated in block 230. In one particular embodiment, the processor determines whether the instruction is authorized to change the privilege level (block 228) by checking the processor's architectural state. For instance, the processor may check virtual memory attributes to determine whether the instruction is authorized to change the privilege level. Alternatively, if the instruction is not authorized to change the architectural CPL, the instruction is simply ignored, and the architectural privilege level is not changed as a result of the instruction.

Further, in accordance with aspects of the invention illustrated in FIG. 5, after decoding an instruction directing the processor to change the architectural CPL 38 from a first to a second privilege level, the processor compares the second privilege level to the architectural CPL 38 in decision block 232. In a specific embodiment, an EPC instruction only increases the architectural CPL 38, and a "return" instruction, for example, instructing a program to return from a subroutine, may lower the architectural CPL 38. Some processors operate at four different privilege levels, with level 0 being the highest privilege level, and level 3 being the lowest. Assume that a processor's architectural CPL is set at privilege level 3, and a first instruction or issue group is processed at that privilege level. If a second instruction or issue group that is assigned the highest privilege level 0, such as an operating system instruction, is to be processed subsequent to the first instruction, an EPC instruction will direct the processor to change the architectural CPL to privilege level 0.

Thus, in decision block 232 (referring to FIG. 5), the processor will compare the architectural CPL, which is set to privilege level 3, with the privilege level specified in the EPC instruction, privilege level 0. Since the EPC instruction directs the processor to change the architectural CPL to a higher privilege level (privilege level 0), in block 236, the processor will flush any instructions in the pipeline subsequent to the EPC instruction, then continue processing the EPC instruction and, when the EPC instruction is retired, increase the architectural CPL from privilege level 3 to privilege level 0 in block 238 and block 240. If, on the other hand, the EPC instruction specifies a privilege level lower than, or the same as, the architectural CPL, the processor will issue a fault in block 234. In alternative embodiments, the instruction would be ignored, and the architectural CPL would not be affected.

Consider another example, in which a subroutine is called. Assume that the subroutine includes instructions that are to be processed at a higher privilege level than the architectural CPL. The subroutine would include an EPC instruction that directs the processor 30 to increase the architectural CPL. When the subroutine completes, a return instruction would instruct the processor 30 to decrease the architectural CPL to the previous privilege level (prior to the subroutine call).

As disclosed above, the present invention is not limited to any particular type of processor that executes instructions in a specific manner. For example, the device and method of the present invention may be employed in a processor that executes instructions speculatively. Processors that pipeline instructions start processing a first instruction, then start a second instruction before the first instruction has completed. If an instruction is conditional, as in an "if . . . then" instruction, the processor does not know which instruction to fetch next, until the condition test has been executed. Some prior art processors will "stall" the pipeline until the condition results are known, hurting performance. More advanced processors speculatively execute the instructions, and predict which way the branch will go based on past history, or other prediction algorithms.

Consider the following example:
IF A=B
THEN C=C+1
ELSE C=C−1
END IF

Until the first instruction has been completely executed, the processor does not know if the next instruction will be the addition instruction or the subtraction instruction. A processor that speculatively executes may start both the addition and subtraction instructions at the same time, and then simply discard whichever result it turns out not to need. In other words, the unused instruction does not affect the processor's state; it is not retired. Other processors may make use of branch prediction to start only the instruction it predicts is more likely to be the result of the "if" statement. If the processor predicts incorrectly, the pipeline is typically flushed, and restarted with the correct instruction.

In a processor that speculatively executes instructions, an instruction that directs the processor to change the architectural CPL 38, such as an EPC instruction, may be speculatively executed. It is possible that the EPC instruction may not actually change the architectural CPL 38. Therefore, the privilege level specified by the EPC instruction, or other instruction that directs a privilege level change, is referred to as a "speculative privilege level" ("SPL"), until the instruction is retired and the architectural CPL is updated (the processor's architectural state is affected). Even though the instruction directing the processor to change the privilege level, such as an EPC instruction, is speculatively executed, it is processed in the manner described herein, wherein instructions subsequent to the EPC instruction are flushed prior to the EPC instruction actually changing the architectural CPL.

In accordance with embodiments of the invention, an SPL may be assigned to each instruction or instruction group being processed in the pipeline 30. In a particular embodiment, an SPL is maintained for each issue group, and the SPL travels down the pipeline with the issue group, observing the same pipeline controls, such as stalls and flushes, as the issue group. Instructions in the pipeline refer to the SPL, rather than the architectural CPL, for all privilege level checks. For example, memory operations would use the SPL for checking for memory exceptions, rather than looking to the architectural CPL stored in the processor's architectural register set. Thus, the architectural CPL is not actually used by the processor when processing instructions. The architectural CPL is necessary, however, if the pipeline is flushed due to a branch misprediction, for example. In this situation, the architectural CPL is used as a "fix-up," returning the pipeline to operating at the privilege level set prior to the pipeline flush.

Figure 6:
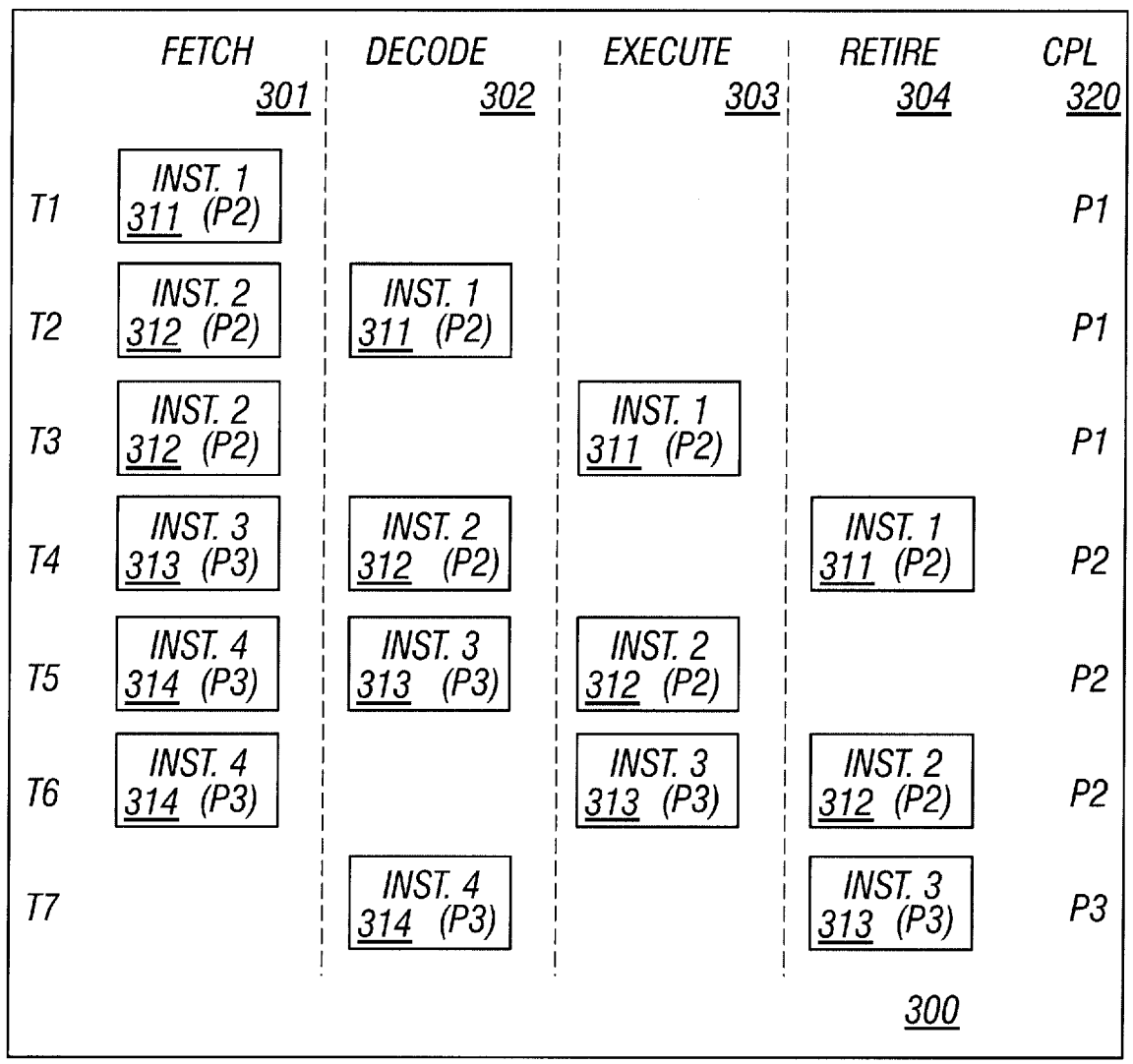
FIG. 6 conceptually illustrates a series of instructions being processed at multiple privilege levels in a pipeline of a processor in accordance with an embodiment of the present invention.

Hence, in some embodiments of the present invention, multiple privilege levels coexist in the same pipeline. This aspect is illustrated conceptually in FIG. 6, which shows a pipeline 300 that includes four stages: a fetch stage 301, a decode stage 302, an execute stage 303 and a retire stage 304. FIG. 6 further illustrates four instructions 311 314 proceeding through the pipeline 300 at time periods T1–T7. At some time prior to the first instruction 311 being fetched, the architectural CPL 320, was set to a first privilege level P1. The first instruction 311 is assigned a second privilege level P2. Since the first instruction will only affect the processor's architectural state (update the architectural CPL 311) if it is retired, the second privilege level P2 is referred to as an SPL until it actually changes the architectural CPL. If the instructions 311–314 comprise groups of instructions, such as issue groups, each issue group will include an instruction specifying the SPL for the issue group.

At time T1, the architectural CPL 320 is at the first privilege level P1, and the first instruction 311 is fetched. At time T2, a second instruction 312 enters the pipeline 300 at the fetch stage 301, and the first instruction 311 moves to the decode stage 302. Upon decoding the first instruction 311, the processor flushes the second instruction 312 from the pipeline 300, because the processor "realizes" that the first instruction 311 will change the architectural CPL when it is retired In other embodiments, the processor may determine whether the instruction will cause the architectural CPL to change during a stage other than the decode stage 302. At time T3, the first instruction 311 moves to the execute stage 303, and the second instruction 312 is fetched. Even though the architectural CPL 320 remains at the first privilege level P1 during times T2–T3, the first instruction is processed based on its SPL, which is the second privilege level P2, at each stage 301–304 as it proceeds through the pipeline 300. At time T4, the second instruction 312 moves to the decode stage 302, the third instruction 313 is fetched, and the first instruction 311 continues down the pipeline 320 to the retire stage 304. When the first instruction 311 is retired, the architectural CPL 320 is changed from the first privilege level P1 to the second privilege level P2. The second instruction 312 is also assigned the second privilege level P2; hence, the processor will not change the architectural CPL 320 as a result of the second instruction 312, unless the first instruction is not retired.

At time T5, the second instruction 312 moves to the execute stage 303, the third instruction 313 moves to the decode stage 302, and the fourth instruction 314 is fetched. Note that the third instruction 313 is assigned a third privilege level P3. Thus, if the third instruction 313 is retired, it will cause the processor to change the architectural CPL 320 from the second privilege level P2 to the third privilege level P3. In an embodiment of the invention, changing the architectural CPL 320 comprises overwriting the privilege level indication stored in the processor's architectural register with an indication of the new privilege level. Upon determining that the third instruction 313 will direct the processor to change the architectural privilege level, the processor flushes the fourth instruction 314 from the pipeline 300. The second instruction 312, which is ahead of the third instruction 313 in the pipeline 300, is not flushed from the pipeline 300. Hence, the processor is processing instructions at two different privilege levels in the pipeline 300.

At time T6, the second instruction 312 advances to the retire stage 304, the third instruction 313 moves to the execute stage 303, and the fourth instruction 314 is fetched. At time T7, the fourth instruction 314 moves to the decode stage 302, and the third instruction 313 advances to the retire stage 304, and upon retirement, the architectural CPL 320 is changed from the second privilege level P2 to the third privilege level P3.

In the embodiment of the invention illustrated in FIG. 6, it is possible for several different privilege levels to exist simultaneously in the pipeline 300. Depending on the number of pipeline stages and the number of privilege levels in a given processor, it is conceivable to have the architectural CPL at one privilege level, and each instruction in the pipeline at different SPLs, since the SPL, rather than the architectural CPL, is used for instruction processing. In alternative embodiments, the processor may maintain the architectural CPL and only a limited number of SPLs at any given time. For example, the processor may maintain one SPL in addition to the architectural CPL, with instructions in the pipeline using the SPL for privilege level checks. An embodiment such as this may be implemented, for example, to reduce hardware complexity.

Aspects of the present invention may be applied to processors that execute instructions in their original program order, or to out-of-order processors, which, as discussed above, may execute instructions in a sequence different than the original instruction order. A typical out-of-order processor includes pipeline stages in addition to those shown in the pipelines illustrated in FIG. 3 and FIG. 6 herein. For example, the pipeline of an out-of-order processor may contain a schedule stage, which receives decoded instructions, and dispatches the instructions to the execute stage in an order that may be different than the original instruction order. In an out-of-order processor in accordance with an embodiment of the present invention, an SPL may be computed for each instruction decoded in a given clock, and this SPL may then be passed on to the scheduling stage on a per instruction, or instruction group, basis. The SPL would then be used at the execution stage when the instruction is scheduled for execution.

Thus, the present invention provides an apparatus and method for changing the privilege level without flushing the entire pipeline 32, thus improving processor 30 performance. Any instructions subsequent (in earlier pipeline stages 34) to an instruction that changes the architectural privilege level are flushed from the pipeline 32, before the processor updates the architectural CPL in accordance with the instruction. Instructions that entered the pipeline 32 prior (in later pipeline stages 34) to the instruction that are to change the architectural privilege level are not flushed, resulting in reduced performance is penalty from privilege level changes.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   pipelining instructions in a processor;
   maintaining an architectural privilege level that is assigned a first privilege level;
   processing a first instruction, prior to the first instruction reaching an execution stage of the pipeline, that directs the processor to change the architectural privilege level to a second privilege level without causing an interrupt; and
   in response to processing said first instruction, flushing subsequent instructions and not prior instructions from the pipeline prior to changing the architectural privilege level to the second privilege level.

2. The method of claim 1 wherein processing the first instruction includes speculatively executing the first instruction.

3. The method of claim 1 wherein processing the first instruction includes decoding the instruction.

4. The method of claim 3 wherein decoding the instruction comprises decoding a type of instruction selected from the group consisting of an enter privilege code instruction and a return instruction.

5. The method of claim 1 wherein processing the first instruction includes pre-decoding the instruction.

6. The method of claim 1 further comprising processing one or more instructions in the pipeline at the second privilege level prior to changing the architectural privilege level to the second privilege level.

7. The method of claim 6 further comprising changing the architectural privilege level to the second privilege level.

8. The method of claim 6 wherein the architectural privilege level is recorded in a register, and wherein the method further comprises overwriting the first privilege level with the second privilege level in the register.

9. The method of claim 6 further comprising processing a second instruction in the pipeline at the second privilege level prior to changing the architectural privilege level to the second privilege level.

10. A processor comprising:
    a first memory in which an architectural privilege level assigned a first privilege level is recorded;
    a second memory storing a plurality of instructions; and
    a pipeline comprising a plurality of processing stages to fetch a first instruction from the second memory, determine, prior to the first instruction reaching an execution stage of the pipeline, whether the first instruction directs the processor to change the architectural privilege level recorded in the first memory to a second privilege level without causing an interrupt, and in response thereto, flush subsequent instructions and not prior instructions from the pipeline prior to changing the architectural privilege level recorded in the first memory to the second privilege level.

11. The processor of claim 10 wherein the pipeline comprises processing stages to fetch a second instruction from the second memory and process the second instruction at the second privilege level prior to changing the architectural privilege level in the first memory to the second privilege level.

12. The processor of claim 10 wherein the second privilege level is a speculative privilege level.

13. The processor of claim 10 wherein the second memory comprises cache memory.

14. The processor of claim 10 wherein the second memory comprises a main memory.

15. The processor of claim 10 wherein the pipeline comprises processing stages to process instructions out-of-order.

16. The processor of claim 15 wherein the second privilege level is a speculative privilege level.

17. The processor of claim 15 wherein the second memory further stores at least a second instruction, and wherein the pipeline comprises processing stages to fetch the second instruction from the second memory and process the second instruction at the second privilege level prior to changing the architectural privilege level recorded in the first memory to the second privilege level.

18. The processor of claim 10 wherein the pipeline comprises processing stages to change the first privilege level recorded in the first memory to the second privilege level.

* * * * *

UNITED STATES PATENT AND TRADEMARK OFFICE
CERTIFICATE OF CORRECTION

PATENT NO. : 6,393,556 B1
DATED : May 21, 2002
INVENTOR(S) : Arora

It is certified that error appears in the above-identified patent and that said Letters Patent is hereby corrected as shown below:

<u>Column 5,</u>
Line 11, after "updated", delete "is".

<u>Column 8,</u>
Line 25, after "retired", insert -- . --.

<u>Column 9,</u>
Line 41, after "performance", delete "is".

Signed and Sealed this

Twenty-seventh Day of August, 2002

*Attest:*

*Attesting Officer*

JAMES E. ROGAN
*Director of the United States Patent and Trademark Office*